Sept. 6, 1932.  L. OLCSVARY  1,876,341
AUTOMATIC COUPLING FOR MINE CARS
Filed March 22, 1928   2 Sheets-Sheet 2
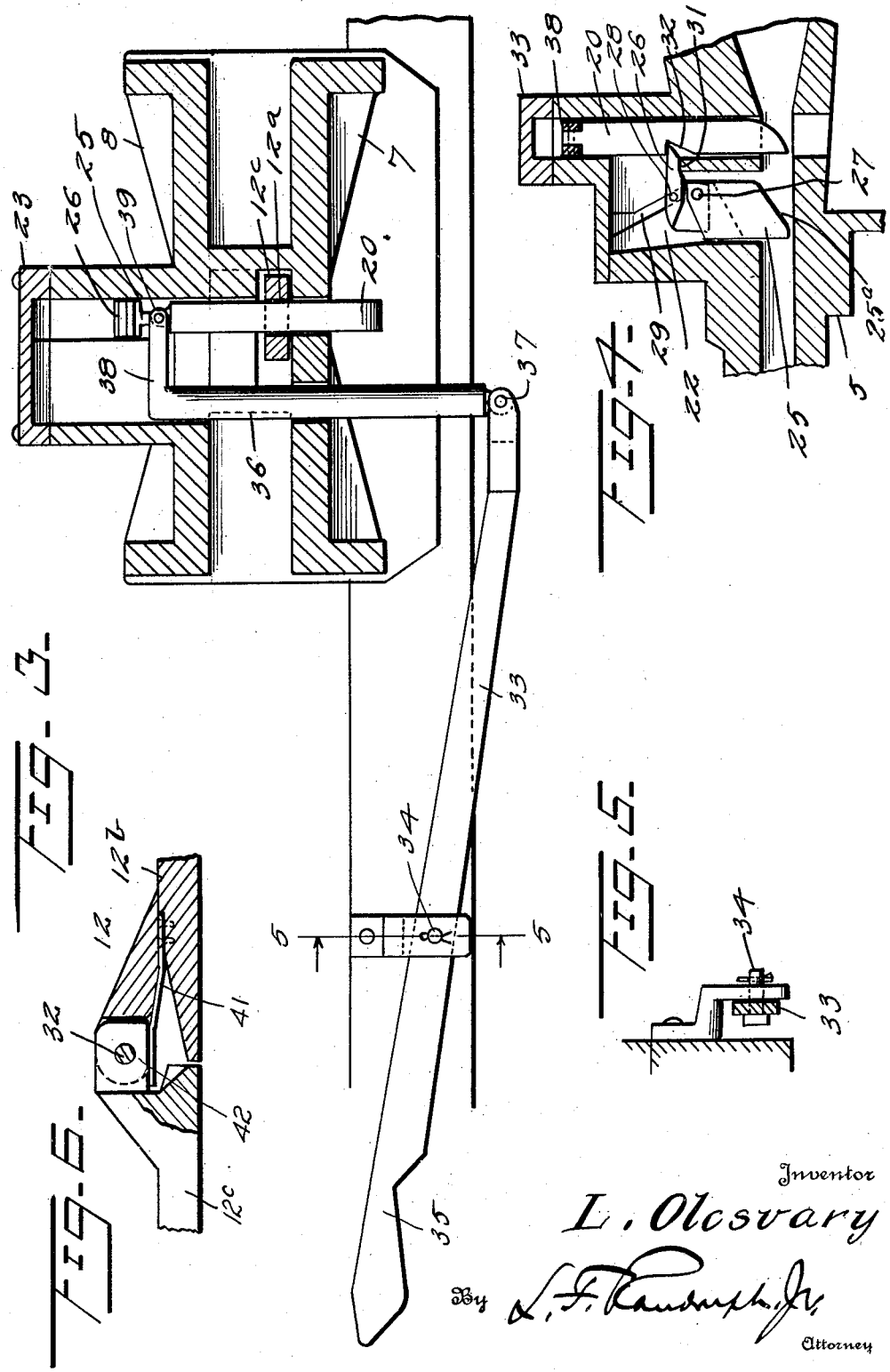

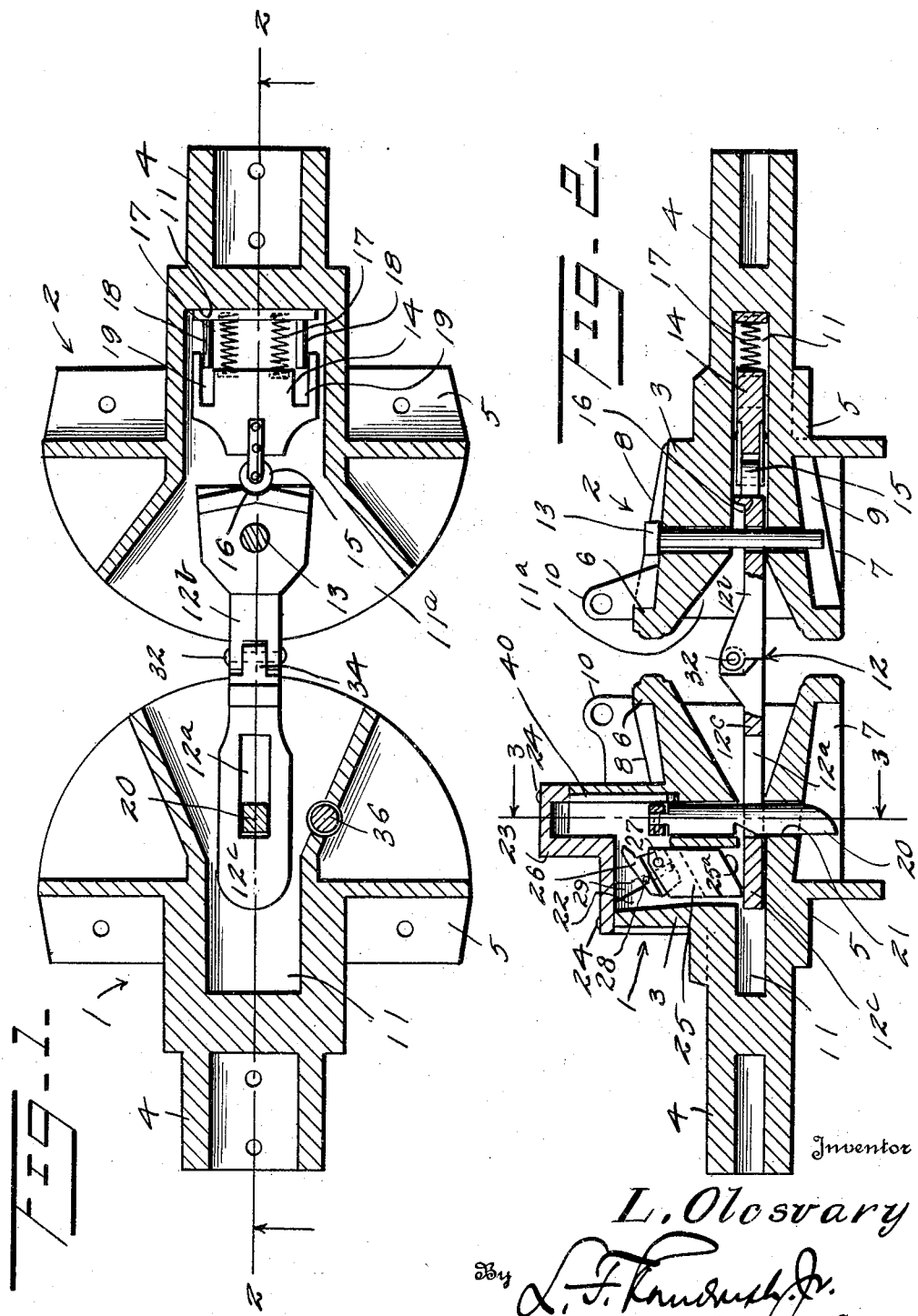

Patented Sept. 6, 1932

1,876,341

UNITED STATES PATENT OFFICE

LOUIS OLCSVARY, OF REPUBLIC, PENNSYLVANIA

AUTOMATIC COUPLING FOR MINE CARS

Application filed March 22, 1928. Serial No. 263,696.

This invention relates to improvements in the car coupling forming the subject-matter of U. S. Letters Patent, 1,139,217, granted to me May 11, 1915.

The present invention has for one of its objects to improve that coupling in a manner to permit the coupling link to be more easily engaged with the coupling heads, and to attain this end comprehends the provision of the coupling heads with entrance recesses having oppositely inclined upper and lower walls and oppositely inclined side walls.

The present invention has for a further object to improve the coupling in a manner to prevent strain on the coupling link during and as the result of the relative vertical movements of the coupling heads, and to attain this end comprehends the provision of a coupling link consisting of sections pivotally connected at a point between the coupling heads.

The present invention has for a further object to provide the coupling with means by which the coupling pin of one of the coupling heads may be easily and safely raised when it is desired to uncouple the cars.

With the foregoing and other objects in view, the nature of which will appear as the description proceeds, the invention consists in the construction, combination and arrangements of parts hereinafter described and claimed, and illustrated in the accompanying drawings, wherein:

Figure 1 is a sectional view taken on a plane extending horizontally and centrally through the coupling, Figure 2 is a sectional view taken on the vertical plane indicated by the line 2—2 of Figure 1, Figure 3 is a sectional view taken on the vertical plane indicated by the line 3—3 of Figure 2, Figure 4 is a detail sectional view illustrating the manner in which the coupling pin of one of the members of the coupling is releasably supported in raised position, Figure 5 is a sectional view taken on the plane indicated by the line 5—5 of Figure 3, and Figure 6 is a fragmentary view partly in section of the coupling link.

The coupling comprises members 1 and 2 which are somewhat similar in construction and embody heads 3, hollow stems 4 and angular flanges 5. The heads 3 are provided at their upper and lower sides with reenforcing flanges 6 and 7, respectively, and with radially arranged reenforcing ribs 8 and 9, respectively. The heads 3 are also provided at their upper sides with apertured lugs 10 through the medium of which the coupling members 1 and 2 may be shifted horizontally or vertically. The coupling members 1 and 2 are secured to their respective cars through the medium of the stems 4 and flanges 5.

The heads 3 are provided with longitudinally extending recesses 11 of rectangular formation in vertical section and having enlarged outer or entrance portions $11^a$. The recesses 11 snugly receive the terminals of a coupling link 12, and their entrance portions $11^a$ have oppositely inclined upper and lower walls and oppositely inclined side walls to facilitate the entry of the terminals of the coupling link into the recesses. The coupling link 12 is connected by a pin 13 to the coupling member 2 for movement with respect thereto about a vertical axis, and it is yieldingly held in the vertical center of the coupling member by means which consist of a block 14 slidably mounted in the recess 11 inwardly of the coupling pin, a roller 15 journaled on the block 14 and engaging in a recess 16 in the inner end of the coupling link, springs 17 urging the block in the direction of the coupling link, and guide pins 18 fixed to the inner wall of the recess and fitting in grooves 19 formed in the block.

The coupling link 12 is normally engaged with the coupling member 2 and is adapted to be automatically engaged with the coupling member 1 during the coupling of the cars. To permit of this being done, the coupling member 1 is provided with a coupling pin 20 which is slidably mounted in a vertical opening 21 and with means for releasably supporting the coupling pin. The opening 21 intersects the recess 11 immediately inward of the entrance portion $11^a$ of the recess and extends through the upper side of the coupling member 1. The coupling pin supporting means is slidably mounted in a vertical opening 22 which is arranged inwardly of the opening 21 and communicates at its lower end with the recess portion 11 and extends through the upper side of the coupling member. The openings 21 and 22 communicate with each other at their upper ends, and said ends thereof are closed by a member 23 which is removably secured in place by elements 24.

The coupling pin supporting means comprises a tumbler block 25 which is slidably mounted in the opening 22 and a dog 26 which is pivoted, as at 27, to the upper end of the tumbler block and is provided with lugs 28 working in grooves 29 formed in the lateral sides of the opening and inclining upwardly and inwardly. The tumbler block 25 has a downwardly and inwardly inclined lower end 30 which extends into the recess 11. The dog 26 rests upon a shoulder 31 and engages in a notch 32 in the rear side of the coupling pin 20. During the coupling of the cars, the coupling link 12 contacts with the lower end of the coupling pin 20 and immediately thereafter contacts with the inclined lower end 25ª of the tumbler block 25, with the result that the coupling pin and tumbler block are elevated. During this movement of the coupling pin 20 and tumbler block 25, the dog 26 is moved rearwardly as the result of its travel in the grooves 29, and the coupling pin is released and moves downwardly through an elongated slot 12ª in the coupling link 12. The coupling block 25 is prevented from returning to its normal position by the coupling link 12 upon which its lower end rests.

To permit the car to be easily, quickly and safely uncoupled, means are provided for raising the coupling pin 20 from a point at the side of the car carrying the coupling member 1. This means comprises a lever 33 which is pivotally mounted between its ends, as at 34, to an end of the car and provided at its outer end with a handle 35. A lever pin 36 is mounted in the coupling member 1 for vertical movement with respect thereto, has its lower end pivoted, as at 37, to the inner end of the lever 33, and is provided at its upper end with an arm 38 pivotally connected, as at 39, to the upper end of the coupling pin 20. The construction of this means and in connection with the coupling pin 20 are such that it is only necessary to depress the outer end of the lever 33 in order to effect the release of the coupling link 12.

During the withdrawal of the coupling link 12 from the coupling member 1, the tumbler block 25 drops to its active position, with the result that its dog 26 is moved into active position and engages with the coupling pin 20 when the lever 33 is released.

The horizontal formation of the entrance portions 11ª of the recesses 11 permits the coupling members 1 and 2 to move relatively in a horizontal direction without placing any strain on the coupling link 12. To permit the coupling members 1 and 2 to move relatively in a vertical direction without straining the coupling link 12, the coupling link is of sectional formation and the sections 12ᵇ and 12ᶜ thereof are pivotally connected as at 32. The coupling section 12ᵇ is held in a substantially horizontal position by the coupling member 2. To permit the coupling section 12ᶜ to enter the coupling member 1 during the coupling of the cars, this section is normally held in alinement with the section 12ᵇ by a leaf spring 41 which is fixed to the section 12ᵇ and contacts with the under side of a lug 42 carried by the section 12ᶜ.

The coupling is especially adapted for use in mine cars, it enables the cars to be readily coupled and it permits the cars to move relatively without danger of injury to any parts of the coupling and without danger of the cars becoming uncoupled. The cap plate 23 prevents foreign matter from entering the openings 21 and 22 and thus insures the unobstructed movements of the coupling pin 20, tumbler block 25 and dog 26.

It should be understood that the drawings are merely illustrative and do not pretend to give exact proportions. Furthermore, the said drawings are illustrative of a preferred construction, it being my expectation that various changes and modifications may be made within the scope of the claim without departing from the spirit and scope of my invention is.

What is claimed is:—

A car coupling comprising a body having a head and stem, the head being formed with a longitudinally extending recess and a chamber rising from the recess, a removable cap for the top of said chamber, a pin slidable vertically in said head and extending through the recess and movable upwardly into said chamber, a latch in said chamber to engage said pin and releasably hold the same in an elevated position, and means to move the pin upwardly into position for engagement by said latch consisting of a lever pivotally mounted with one end extending beneath the head, a bar slidably received in a passage formed vertically in said head with its lower end extending below the head and pivoted to said lever and its upper end portion extending into said chamber, and a side arm extending from the upper end of said bar and pivoted to said pin.

In testimony whereof I affix my signature.

LOUIS OLCSVARY.